(12) United States Patent
Sugiura

(10) Patent No.: US 9,025,879 B2
(45) Date of Patent: May 5, 2015

(54) ELECTRONIC APPARATUS AND HANDWRITTEN DOCUMENT PROCESSING METHOD

(71) Applicant: Kabushiki Kaisha Toshiba, Minato-ku, Tokyo (JP)

(72) Inventor: Chikashi Sugiura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 13/763,181

(22) Filed: Feb. 8, 2013

(65) Prior Publication Data

US 2014/0119659 A1 May 1, 2014

(30) Foreign Application Priority Data

Oct. 26, 2012 (JP) ................................. 2012-236690

(51) Int. Cl.
*G06K 9/00* (2006.01)

(52) U.S. Cl.
CPC .............. *G06K 9/00463* (2013.01); *G06K 9/00* (2013.01); *G06K 9/00416* (2013.01); *G06K 9/00422* (2013.01)

(58) Field of Classification Search
CPC ..... G06K 9/18; G06K 2209/011; G06K 9/46; G06K 9/6255; G06K 9/60; G06K 9/62; G06K 2209/01; G06K 9/344; G06K 9/48; G06F 3/041; G06F 3/04883; G06F 17/211; H04N 1/4115; H04N 1/00331; G09G 5/28; G09G 5/26; G09G 5/24; G07C 9/0015
USPC ......... 382/181, 186, 187, 189, 213, 216, 315, 382/222, 246
See application file for complete search history.

(56) References Cited

U.S. PATENT DOCUMENTS 4,180,798 A * 12/1979 Komori et al. ................. 382/181
4,944,022 A * 7/1990 Yasujima et al. ............. 382/155

(Continued)

FOREIGN PATENT DOCUMENTS

| JP | 62-159280 A | 7/1987 |
| JP | 63-129484 A | 6/1988 |

(Continued)

OTHER PUBLICATIONS

First Office Action mailed by Japan Patent Office on May 7, 2013 in the corresponding Japanese Application No. 2012-236690—7 pages.

(Continued)

*Primary Examiner* — Vu Le
*Assistant Examiner* — Aklilu Woldemariam
(74) *Attorney, Agent, or Firm* — Knobbe Martens Olson & Bear LLP

(57) ABSTRACT

According to one embodiment, an electronic apparatus includes a line recognition module, a character recognition module and a generator. The line recognition module recognizes lines in a handwritten document. The character recognition module recognizes character codes corresponding to handwritten characters in a first line and a second line which follows the first line. The generator generates, if the first and second lines satisfy a condition, document data using first character codes corresponding to the first line and second character codes corresponding to the second line, the formed document data including either one of the first character codes at a position of the second line or including at least one of the second character codes at a position of the first line.

22 Claims, 13 Drawing Sheets

(56) References Cited

U.S. PATENT DOCUMENTS

| | | | |
|---|---|---|---|
| 5,113,452 A * | 5/1992 | Chatani et al. | 382/187 |
| 5,331,431 A * | 7/1994 | Jasinski | 358/462 |
| 5,588,073 A * | 12/1996 | Lee et al. | 382/187 |
| 5,754,685 A | 5/1998 | Takahashi et al. | |
| 5,907,852 A * | 5/1999 | Yamada | 715/222 |
| 5,970,170 A * | 10/1999 | Kadashevich et al. | 382/187 |
| 6,130,962 A * | 10/2000 | Sakurai | 382/190 |
| 6,208,744 B1 * | 3/2001 | Ishige et al. | 382/100 |
| 6,275,608 B1 | 8/2001 | Tezuka | |
| 6,317,762 B1 * | 11/2001 | Okawa et al. | 715/246 |
| 6,549,662 B1 | 4/2003 | Kobara et al. | |
| 6,681,372 B2 * | 1/2004 | Yajima | 715/268 |
| 7,184,167 B1 | 2/2007 | Ito et al. | |
| 7,203,903 B1 * | 4/2007 | Thompson et al. | 715/203 |
| 7,409,090 B2 | 8/2008 | Akiyama et al. | |
| 8,612,521 B2 * | 12/2013 | Tonegawa | 709/206 |
| 2006/0088216 A1 * | 4/2006 | Kawamura et al. | 382/187 |
| 2007/0274590 A1 * | 11/2007 | Arai | 382/187 |
| 2013/0305146 A1 * | 11/2013 | Hashiba et al. | 715/255 |

FOREIGN PATENT DOCUMENTS

| | | |
|---|---|---|
| JP | 01-130291 A | 5/1989 |
| JP | 02-136956 A | 5/1990 |
| JP | 04-024782 A | 1/1992 |
| JP | 04-252389 A | 9/1992 |
| JP | 05-084549 | 4/1993 |
| JP | 06-089367 | 3/1994 |
| JP | 09-167246 A | 6/1997 |
| JP | 10-293813 A | 11/1998 |
| JP | 11-161736 A | 6/1999 |
| JP | 11-191159 | 7/1999 |
| JP | 2000-293624 A | 10/2000 |
| JP | 2001-101179 A | 4/2001 |
| JP | 2002-175498 A | 6/2002 |
| JP | 2003-099713 | 4/2003 |
| JP | 2007-095102 A | 4/2007 |
| JP | 2007-199919 A | 8/2007 |

OTHER PUBLICATIONS

First Office Action mailed by Japan Patent Office on Sep. 9, 2014 in the corresponding Japanese Application No. 2013-254660, which is a divisional patent application of JP 2012-236690, filed Dec. 10, 2013—7 pages.

Office Action mailed by Japan Patent Office on Oct. 21, 2014 in the corresponding Japanese Appeal No. 2012-236690 (Appeal No. 2013-24267)—5 pages.

* cited by examiner

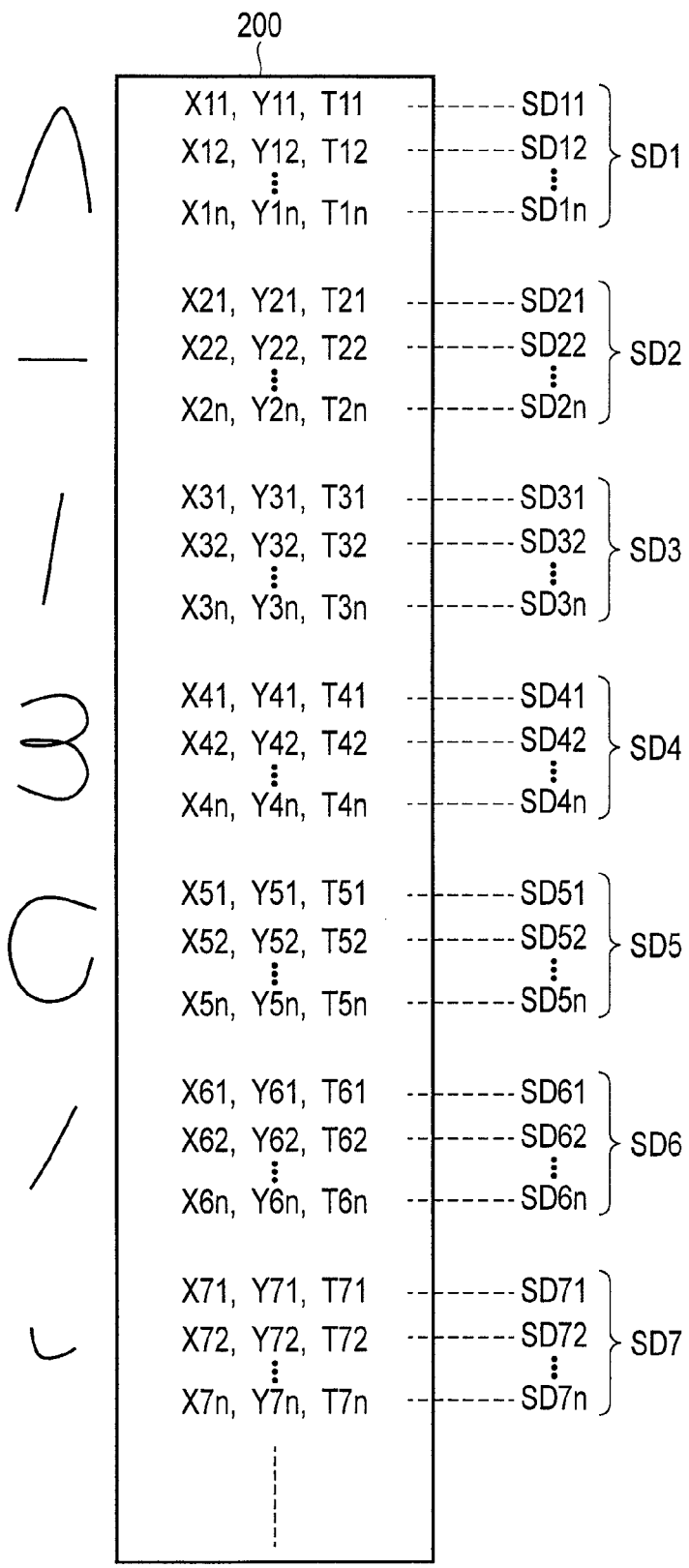
F I G. 3

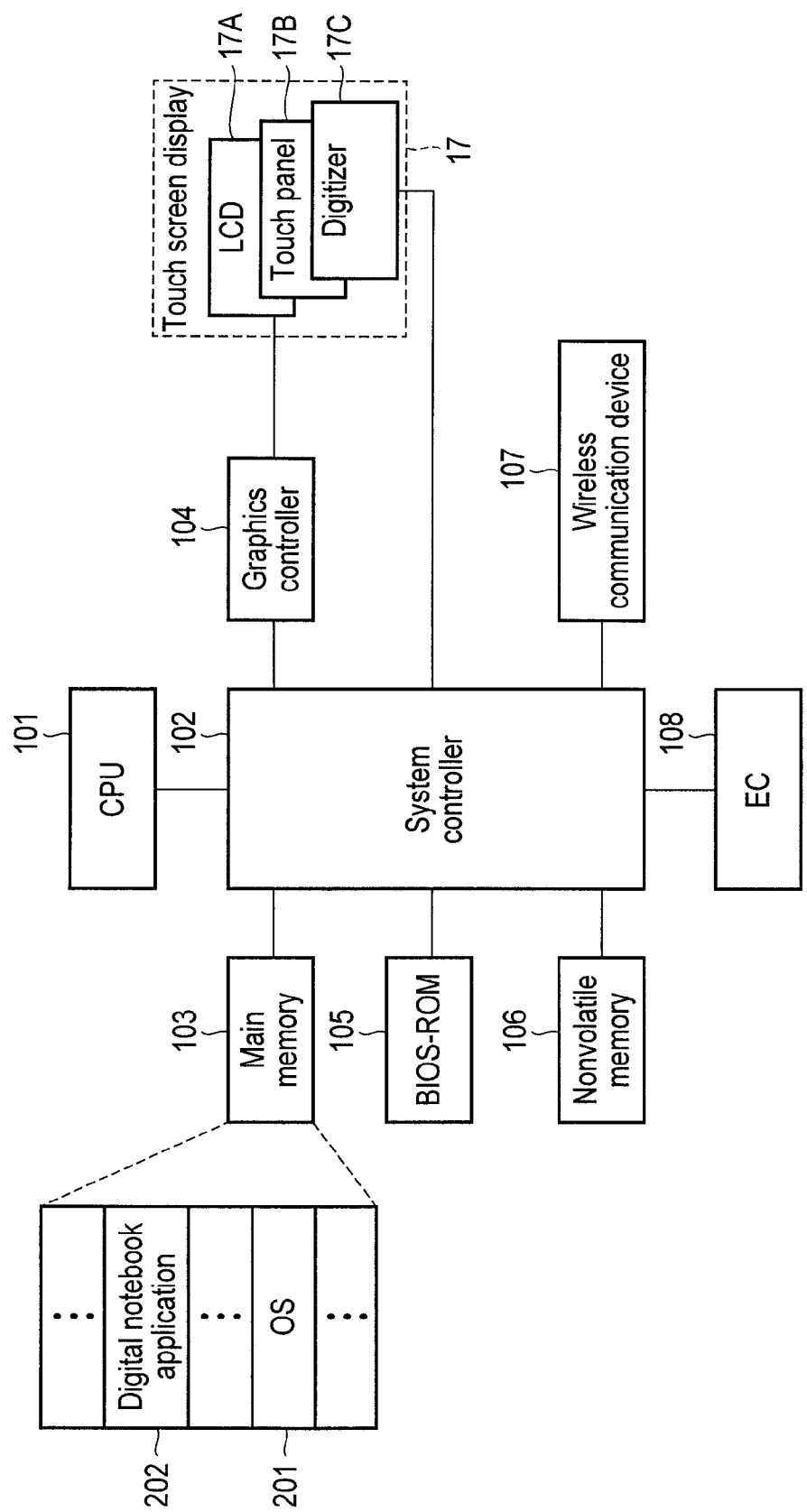
F I G. 4

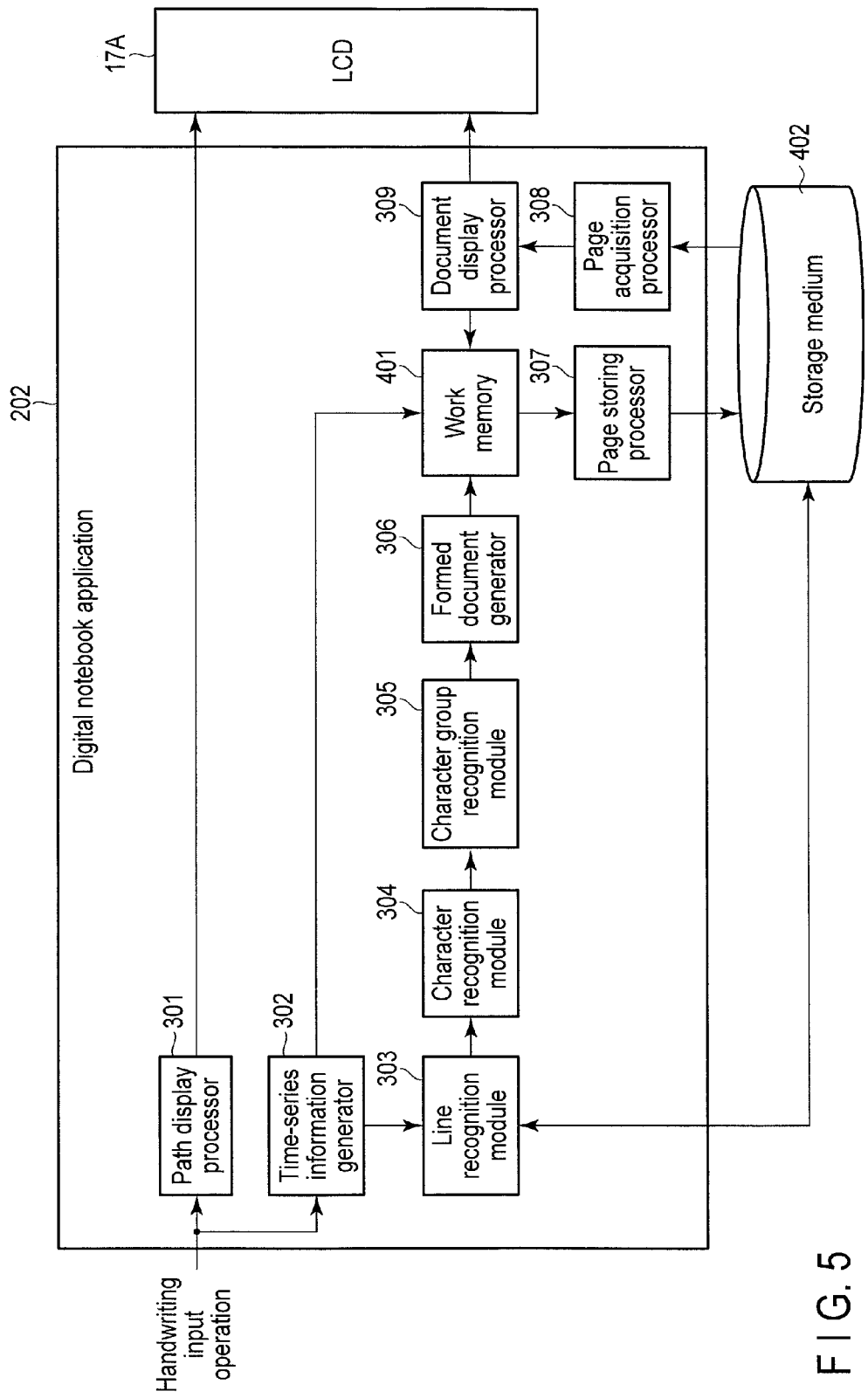
F I G. 5

2012  03/28
651 652 653 654

Summary
655      656
☐ Refer documents

☐ Send by mail

Please make provision against next phase according to the determination in today's meeting. —65n

Summary — 672

☐ Refer documents
☐ Send by mail — 673

Please make provision against next phase according to the determination in today's meeting. — 674

Please refer the following table.

|  | June | July | August |
|---|---|---|---|
| tomato | 4 | 10 | 6 |
| eggplant | 6 | 2 | 5 |
| pepper | 11 | 21 | 3 |

FIG. 12

ELECTRONIC APPARATUS AND HANDWRITTEN DOCUMENT PROCESSING METHOD

CROSS-REFERENCE TO RELATED APPLICATIONS

This application is based upon and claims the benefit of priority from Japanese Patent Application No. 2012-236690, filed Oct. 26, 2012, the entire contents of which are incorporated herein by reference.

FIELD

Embodiments described herein relate generally to processing of a handwritten document.

BACKGROUND

In recent years, various electronic apparatuses such as tablets, PDAs, and smartphones have been developed. Most of electronic apparatuses of this type include touch screen displays so as to facilitate user's input operations.

When the user touches a menu or object displayed on the touch screen display with the finger or the like, he or she can instruct the electronic apparatus to execute a function associated with the touched menu or object.

Some of such electronic apparatuses have a function of allowing the user to handwrite characters, figures, and the like on the touch screen display. A handwritten document (handwritten page) including such handwritten characters and figures is stored, and is browsed as needed.

An optical character recognition (OCR) technique of generating image data of a paper document (paper page) such as a notebook by scanning characters handwritten on that document, and recognizing handwritten characters using this image data is used. With this technique, handwritten characters can be converted into character codes.

With the OCR, for example, handwritten characters are recognized in turn from an upper left position of a scanned handwritten document, and character codes of the recognized characters are output. For this reason, for example, character codes arranged in an output order are displayed on a screen as a recognition result.

However, characters on a handwritten document are often handwritten at positions intended by the user so as to be visually recognized as groups, for example, paragraphs, items in an itemized form, and captions. For this reason, it is often expected to recognize not only characters themselves on a handwritten document but also a layout of characters.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary view for explaining time-series information corresponds to the handwritten document shown in FIG. 2, the time-series information being stored in a storage medium by the electronic apparatus of the embodiment.

FIG. 4 is an exemplary block diagram showing the system configuration of the electronic apparatus of the embodiment.

FIG. 5 is an exemplary block diagram showing the functional configuration of a digital notebook application program executed by the electronic apparatus of the embodiment.

FIG. 9 is an exemplary view for explaining characters recognized from the handwritten document shown in FIG. 7.

FIG. 10 is an exemplary view for explaining groups recognized from the handwritten document shown in FIG. 7.

FIG. 12 is an exemplary view for explaining groups recognized from the handwritten document shown in FIG. 11.

DETAILED DESCRIPTION

Various embodiments will be described hereinafter with reference to the accompanying drawings.

In general, according to one embodiment, an electronic apparatus includes a line recognition module, a character recognition module and a generator. The line recognition module is configured to recognize a plurality of lines in a handwritten document. The character recognition module is configured to recognize character codes corresponding to a plurality of handwritten characters in a first line and a second line, the second line following the first line. The generator is configured to generate, if the first line and the second line satisfy a first condition, first formed document data using a plurality of first character codes corresponding to the first line and a plurality of second character codes corresponding to the second line, the first formed document data including either one of the first character codes at a position corresponding to the second line or including at least one of the second character codes at a position corresponding to the first line.

Figure 1:
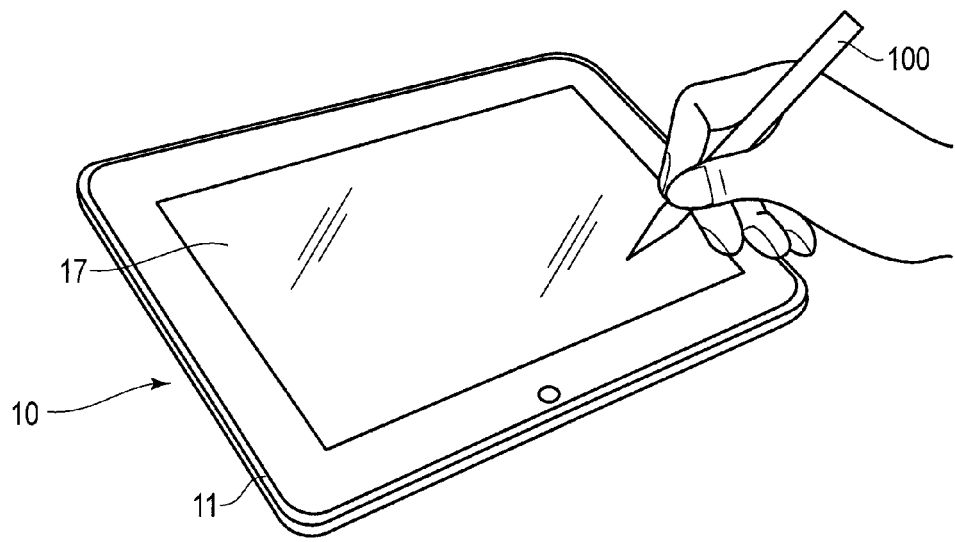
FIG. 1 is an exemplary perspective view showing the external appearance of an electronic apparatus according to an embodiment.

FIG. 1 is a perspective view showing the external appearance of an electronic apparatus according to one embodiment. This electronic apparatus is, for example, a pen-based portable electronic apparatus which allows a handwriting input using a pen or the finger. This electronic apparatus can be implemented as a tablet computer, notebook-type personal computer, smartphone, PDA, and the like. The following description will be given under the assumption that this electronic apparatus is implemented as a tablet computer 10. The tablet computer 10 is a portable electronic apparatus which is also called a tablet or slate computer, and includes a main body 11 and touch screen display 17, as shown in FIG. 1. The touch screen display 17 is attached to be overlaid on the upper surface of the main body 11.

The main body 11 has a thin box-shaped housing. The touch panel screen 17 incorporates a flat panel display and a sensor which is configured to detect a touch position of a pen or finger on the screen of the flat panel display. The flat panel display may be, for example, a liquid crystal display (LCD). As the sensor, for example, a touch panel of a capacitance type, a digitizer of an electromagnetic induction type, or the like can be used. The following description will be given under the assumption that both the two types of sensors, that is, the digitizer and touch panel are incorporated in the touch screen display 17.

Each of the digitizer and touch panel is arranged to cover the screen of the flat panel display. This touch screen display 17 can detect not only a touch operation on the screen using the finger but also that on the screen using a pen 100. The pen 100 may be, for example, an electromagnetic induction pen.

The user can make a handwriting input operation on the touch screen display 17 using an external object (pen 100 or finger). During the handwriting input operation, a path of movement of the external object (pen 100 or finger), that is, a path (handwriting) of a stroke handwritten by the handwriting input operation on the screen is drawn in real-time, thereby displaying the path of each stroke on the screen. The path of the movement of the external object while the external object is in contact with the screen corresponds to one stroke. A number of sets of strokes corresponding to a handwritten character or figure, that is, a number of sets of paths (handwriting) configure a handwritten document.

In this embodiment, this handwritten document is stored in a storage medium not as image data but as handwritten document data including coordinate sequences of paths of respective strokes and time-series information indicative of an order relation between strokes. Details of this time-series information will be described in detail later with reference to FIG. 3. This time-series information generally means a set of time-series stroke data corresponding to a plurality of strokes. Each stroke data is not particularly limited as long as it is data that can express one stroke which can be input by handwriting, and for example, includes a coordinate data sequence (time-series coordinates) corresponding to respective points on a path of this stroke. An arrangement order of these stroke data corresponds to a handwriting order of respective strokes, that is, a stroke order.

The tablet computer 10 can read existing arbitrary handwritten document from the storage medium, and can display, on the screen, a handwritten document corresponding to this handwritten document data. That is, the tablet computer 10 can display a handwritten document on which paths corresponding to a plurality of strokes indicated by time-series information are drawn.

Figure 2:
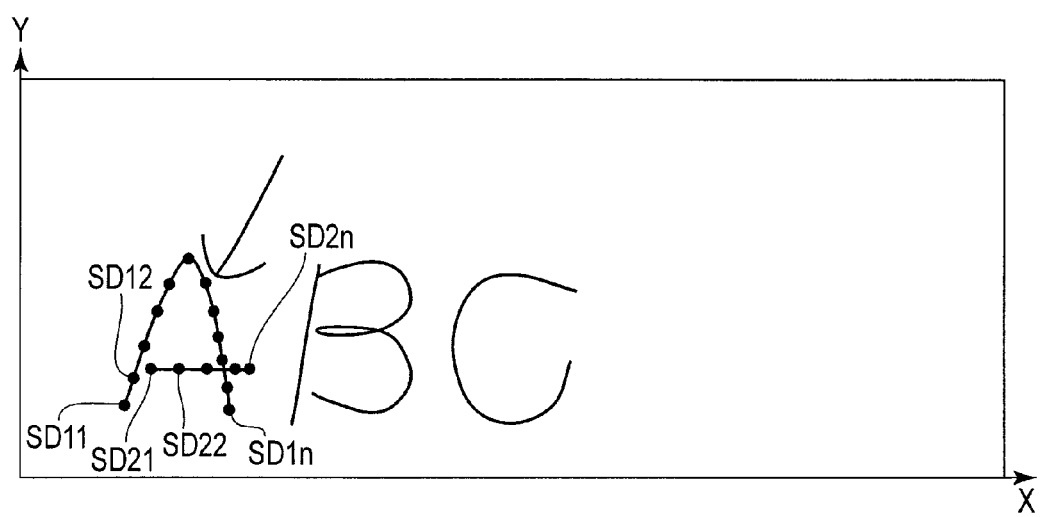
FIG. 2 is a view showing an example of handwritten document to be processed by the electronic apparatus of the embodiment.

The relationship between strokes (a character, mark, symbol, figure, table, and the like) handwritten by the user and the time-series information will be described below with reference to FIGS. 2 and 3. FIG. 2 shows an example of a handwritten document (handwritten character string) handwritten on the touch screen display 17 using the pen 100 or the like.

In a handwritten document, still another character, figure, or the like is handwritten above already handwritten characters, figures, or the like. FIG. 2 assumes a case in which a handwritten character string "ABC" is handwritten in an order of "A", "B", and "C", and a handwritten arrow is then handwritten in the vicinity of a handwritten character "A".

The handwritten character "A" is expressed by two strokes (a path of a "Λ" shape and that of a "-" shape) handwritten using the pen 100 or the like, that is, two paths. The "Λ"-shaped path of the pen 100, which is handwritten first, is sampled in real-time at, for example, equal time intervals, thereby obtaining time-series coordinates SD11, SD12, . . . , SD1n of the "Λ"-shaped stroke. Likewise, the "-"-shaped path of the pen 100, which is handwritten next, is sampled, thereby obtaining time-series coordinates SD21, SD22, . . . , SD2n of a "-"-shaped stroke.

The handwritten character "B" is expressed by two strokes handwritten using the pen 100 or the like, that is, two paths. The handwritten character "C" is expressed by one stroke handwritten using the pen 100 or the like, that is, one path. The handwritten "arrow" is expressed by two strokes handwritten using the pen 100 or the like, that is, two paths.

FIG. 3 shows time-series information 200 corresponding to the handwritten document shown in FIG. 2. The time-series information includes a plurality of stroke data SD1, SD2, . . . , SD7. In the time-series information 200, these stroke data SD1, SD2, . . . , SD7 are time-serially arranged in a stroke order, that is, a handwritten order of a plurality of strokes.

In the time-series information 200, the first and second stroke data SD1 and SD2 respectively indicate two strokes of the handwritten character "A". The third and fourth stroke data SD3 and SD4 respectively indicate two strokes of the handwritten character "B". The fifth stroke data SD5 indicates one stroke of the handwritten character "C". The sixth and seventh stroke data SD6 and SD7 respectively indicate two strokes of the handwritten arrow.

Each stroke data includes a coordinate data sequence (time-series coordinates) corresponding to one stroke, that is, a plurality of coordinates corresponding to a plurality of points on a path of one stroke. In each stroke data, the plurality of coordinates are time-serially arranged in an order that stroke was written. For example, as for the handwritten character "A", the stroke data SD1 includes a coordinate data sequence (time-series coordinates) corresponding to respective points on the path of the "Λ"-shaped stroke of the handwritten character "A", that is, n coordinate data SD11, SD12, . . . , SD1n. The stroke data SD2 includes a coordinate data sequence corresponding to respective points on the path of the "-"-shaped stroke of the handwritten character "A", that is, n coordinate data SD21, SD22, . . . , SD2n. Note that the number of coordinate data may be different for each stroke data.

Each coordinate data indicates X and Y coordinates corresponding to one point in the corresponding path. For example, the coordinate data SD11 indicates an X coordinate (X11) and Y coordinate (Y11) of a start point of the "Λ"-shaped stroke. Also, the coordinate data SD1n indicates an X coordinate (X1n) and Y coordinate (Y1n) of an end point of the "Λ"-shaped stroke.

Furthermore, each coordinate data may include time stamp information T indicative of a handwritten timing of a point corresponding to that coordinate data. The handwritten timing may be either an absolute time (for example, year, month, day, hour, minute, second) or a relative time with reference to a certain timing. For example, an absolute time (for example, year, month, day, hour, minute, second) at which a stroke began to be written may be added to each stroke data as time stamp information, and a relative time indicative of a difference from the absolute time may be appended to each coordinate data in that stroke data as the time stamp information T.

In this way, using the time-series information in which the time stamp information T is added to each coordinate data, the temporal relationship between strokes can be precisely expressed.

Information (Z) indicative of a writing pressure may be added to each coordinate data.

Furthermore, in this embodiment, since a handwritten document is stored as the time-series information 200 including sets of time-series stroke data in place of an image or character recognition results, as described above, handwritten characters and figures can be handled independently of languages. Hence, the structure of the time-series information 200 of this embodiment can be commonly used in various countries using different languages around the world.

FIG. 4 shows the system configuration of the tablet computer 10.

As shown in FIG. 4, the tablet computer 10 includes a CPU 101, a system controller 102, a main memory 103, a graphics controller 104, a BIOS-ROM 105, a nonvolatile memory 106, a wireless communication device 107, an embedded controller (EC) 108, and the like.

The CPU 101 is a processor, which controls operations of various components in the tablet computer 10. The CPU 101 executes various software programs which are loaded from the nonvolatile memory 106 as a storage device onto the main memory 103. These software programs include an operating system (OS) 201 and various application programs. The application programs include a digital notebook application program 202. This digital notebook application program 202 has a function of creating and displaying the aforementioned handwritten document, a function of converting a handwritten document into a formed document including character codes, and the like.

The CPU 101 also executes a basic input/output system (BIOS) stored in the BIOS-ROM 105. The BIOS is a program required for hardware control.

The system controller 102 is a device which connects a local bus of the CPU 101 and various components. The system controller 102 also incorporates a memory controller which controls accesses to the main memory 103. The system controller 102 also has a function of executing communications with the graphics controller 104 via, for example, a PCI EXPRESS serial bus.

The graphics controller 104 is a display controller which controls an LCD 17A used as a display monitor of this tablet computer 10. A display signal generated by this graphics controller 104 is sent to the LCD 17A. The LCD 17A displays a screen image based on the display signal. On this LCD 17A, a touch panel 17B and digitizer 17C are arranged. The touch panel 17B is a capacitance type pointing device used to allow the user to make an input on the screen of the LCD 17A. The touch panel 17B detects a touch position of the finger on the screen, a movement of the touch position, and the like. The digitizer 17C is an electromagnetic induction type pointing device used to allow the user to make an input on the screen of the LCD 17A. The digitizer 17C detects a touch position of the pen 100 on the screen, a movement of the touch position, and the like.

The wireless communication device 107 is a device configured to execute wireless communications such as wireless LAN or 3G mobile communications. The EC 108 is a one-chip microcomputer including an embedded controller required for power management. The EC 108 has a function of turning on/off the power supply of this tablet computer 10 in response to an operation of a power button by the user.

The functional configuration of the digital notebook application program 202 will be described below with reference to FIG. 5. The digital notebook application program 202 executes creation, displaying, editing, and the like of a handwritten document using stroke data input by handwriting input operation on the touch screen display 17. Also, the digital notebook application program 202 forms a handwritten document. That is, the digital notebook application program 202 can convert handwritten characters in a handwritten document into character codes, and can generate formed document data which corresponds to a document in which the character codes are arranged based on character sizes and a layout on the handwritten document.

The digital notebook application program 202 includes, for example, a path display processor 301, a time-series information generator 302, a line recognition module 303, a character recognition module 304, a character group recognition module 305, a formed document generator 306, a page storing processor 307, a page acquisition processor 308, a document display processor 309, and the like.

The touch screen display 17 is configured to generate events "touch", "move (slide)", "release", and the like. The "touch" event indicates that the external object touched on the screen. The "move (slide)" event indicates that a touch position was moved while the external object touched on the screen. The "release" event indicates that the external object was released from the screen.

The path display processor 301 and time-series information generator 302 receive the "touch" or "move (slide)" event generated by the touch screen display 17, thereby detecting a handwriting input operation. The "touch" event includes coordinates of a touch position. The "move (slide)" event includes coordinates of a touch position of a move destination. Therefore, the path display processor 301 and time-series information generator 302 can receive a coordinate sequence corresponding to a path of a movement of a touch position from the touch screen display 17.

The path display processor 301 receives a coordinate sequence from the touch screen display 17, and displays, on the screen of the LCD 17A in the touch screen display 17, a path of each stroke handwritten by a handwriting input operation using the pen 100 or the like based on this coordinate sequence. This path display processor 301 draws a path of the pen 100 while the pen 100 touches on the screen, that is, that of each stroke on the screen of the LCD 17A.

The time-series information generator 302 receives the aforementioned coordinate sequence output from the touch screen display 17. Then, the time-series information generator 302 generates time-series information (stroke data) having the structure described in detail above using FIG. 3 based on this coordinate sequence. In this case, the time-series information, that is, coordinates and time stamp information corresponding to respective points of strokes may be temporarily stored in a work memory 401.

The page storing processor 307 stores the generated time-series information (that temporarily stored in the work memory 401) in a storage medium 402 as handwritten document data. The storage medium 402 is, for example, a storage device in the tablet computer 10.

The page acquisition processor 308 reads arbitrary handwritten document data which has already been stored in the storage medium 402. The read handwritten document data is sent to the document display processor 309. The document display processor 309 analyzes the handwritten document data, and displays paths of respective strokes indicated by the time-series information on a screen as a handwritten document (handwritten page) based on the analysis result.

With the aforementioned modules, the user can create and browse a handwritten document including handwritten characters.

Figure 6:
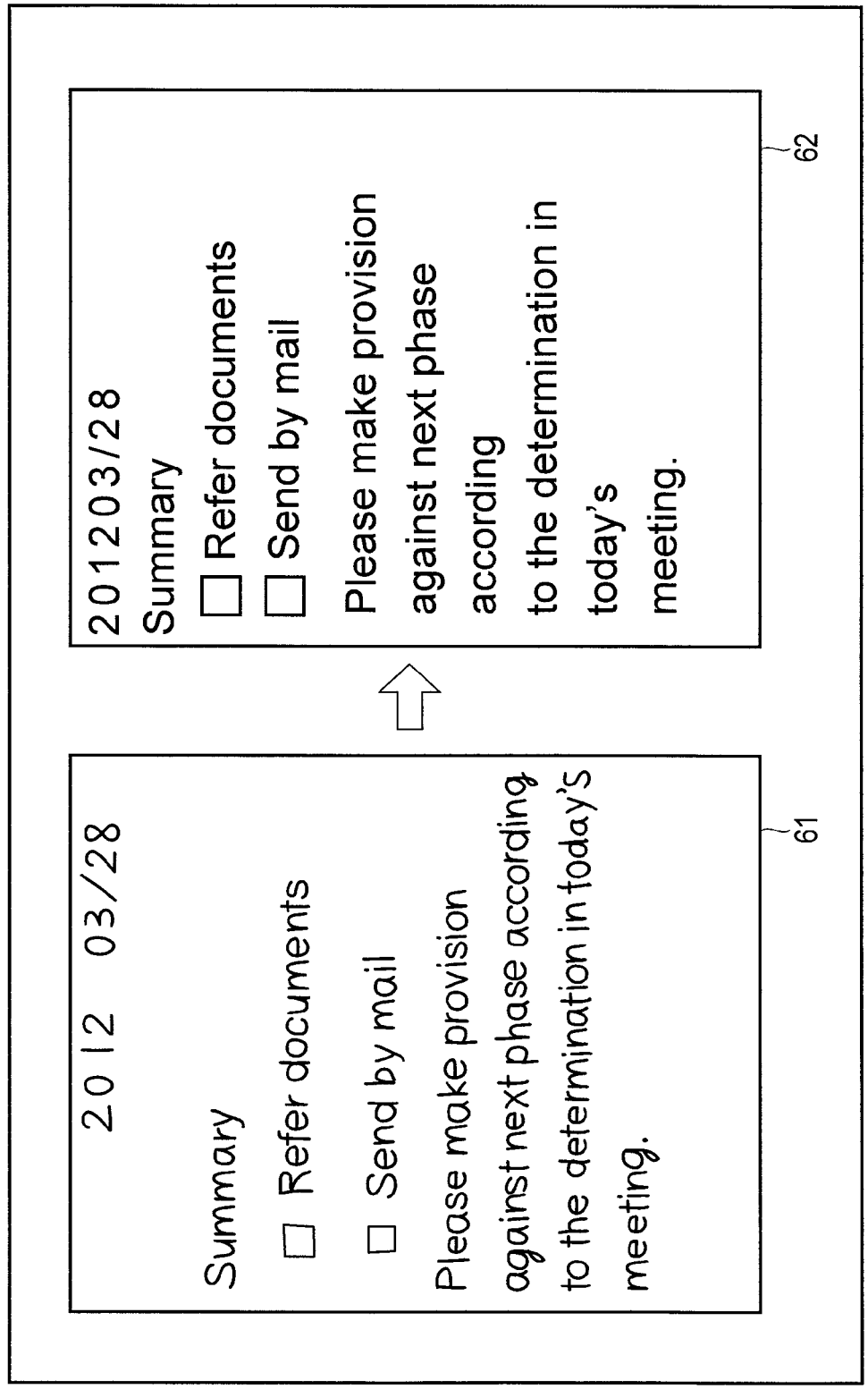
FIG. 6 is a view showing a character recognition example of a handwritten document.

The created handwritten document can also be converted into character codes by character recognition. FIG. 6 shows a character recognition example of a handwritten document (handwritten page) 61. Characters in the handwritten document 61 are converted into character codes, and these character codes are output as a character recognition result 62. In this character recognition result 62, recognized characters are laid out for respective lines on the handwritten document 61. For example, a character string "Summary" for one line on the handwritten document 61 is also displayed on the character recognition result 62 as a character string (character codes) "Summary" for one line. Also, a sentence "Please make provision . . . in today's meeting." is handwritten across lines on the handwritten document 61. On the character recognition result 62, this sentence is broken for each line on the handwritten document 61, and is displayed with unnatural line breaks in a broken state although it is one sentence.

In this manner, by only the character recognition of the handwritten document 61, recognized characters (character codes) are merely placed in each line, and information associated with the composition such as positions and sizes of characters, and paragraphs in the handwritten document 61 is lost. For this reason, for example, one sentence is displayed with unnatural line breaks, and such recognition result may be hardly used as a document. Also, such document is more likely to be unreadable for the user.

Figure 7:
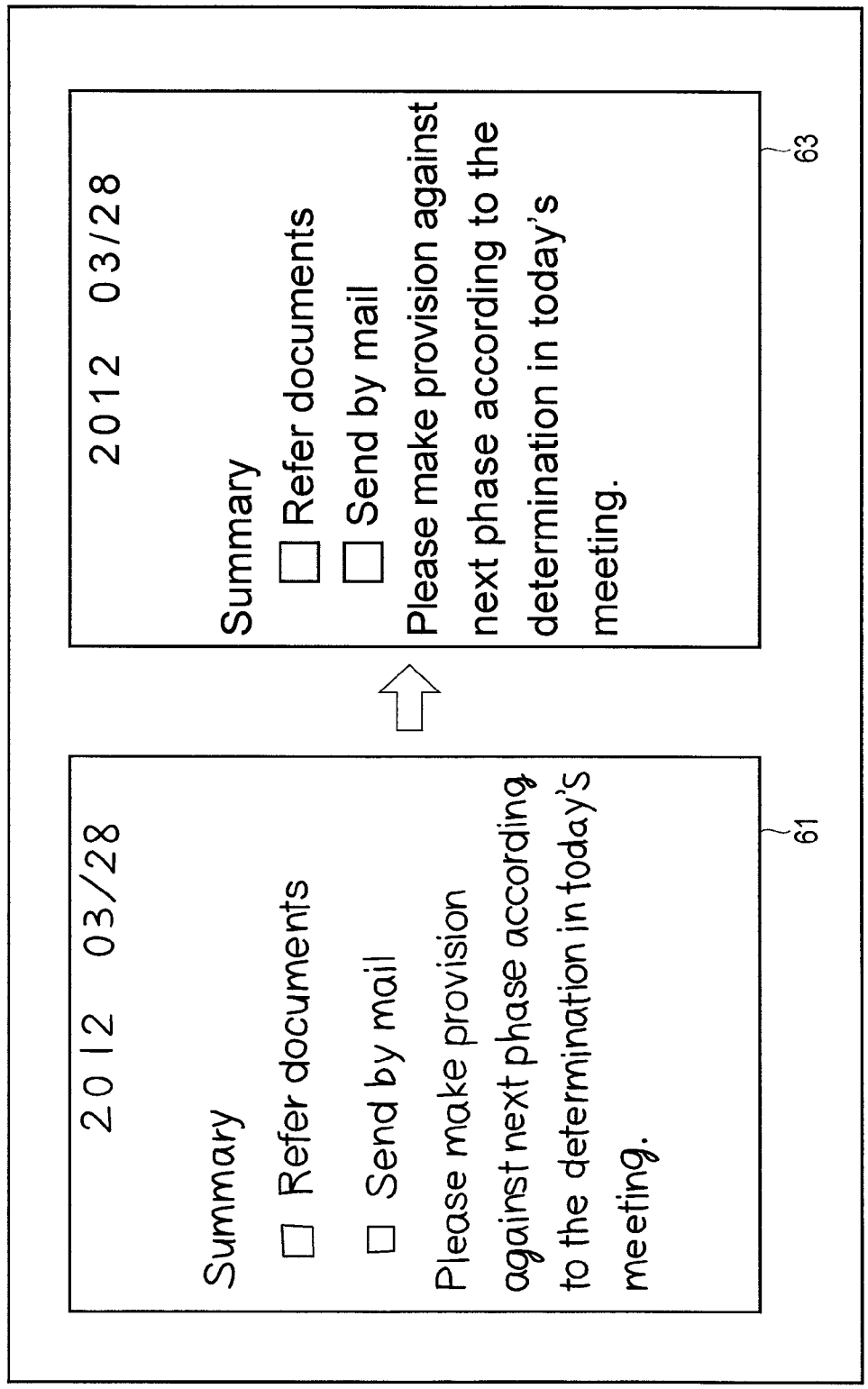
FIG. 7 is a view showing a conversion example of the handwritten document shown in FIG. 6 into a formed document including character codes by the electronic apparatus of the embodiment.

For this reason, as shown in FIG. 7, in this embodiment recognizes character codes corresponding to handwritten characters included in the handwritten document 61 are recognized, and a document (to be also referred to as a formed page hereinafter) 63 in which the layout of the recognized character codes is formed is generated. That is, in this embodiment, a document by writing out the handwritten document 61 is generated.

In the formed document (formed page) 63, a character string "2012 03/28" is laid out at a position corresponding to that on the handwritten document 61. In the formed document 63, indents at the beginning of two itemized items in the handwritten document 61 are maintained. Also, in the formed document 63, corresponding characters are laid out so as not to break one sentence "Please make provision . . . in today's meeting." Furthermore, characters (character codes) are displayed to have sizes (font sizes) corresponding to those on the handwritten document 61.

In this way, in this embodiment, the formed document 63 is generated without losing information associated with the composition such as positions and sizes of characters and groups to which the characters belong on the handwritten document 61. This group is that to which characters to be handled as one set such as a paragraph, an itemized form, a caption, a table, and a mathematical expression belong.

Processing for converting a handwritten document into a formed document using handwritten document data including time-series information generated by the time-series information generator 302 will be described below.

The line recognition module 303 recognizes a plurality of lines included in handwritten document data. For example, the line recognition module 303 recognizes a plurality of lines including one or more handwritten characters on the handwritten document 61 using the handwritten document data. More specifically, the line recognition module 303 recognizes a line based on changes of coordinates of handwritten strokes using a plurality of stroke data corresponding to a plurality of strokes handwritten on the handwritten document 61.

Figure 8:
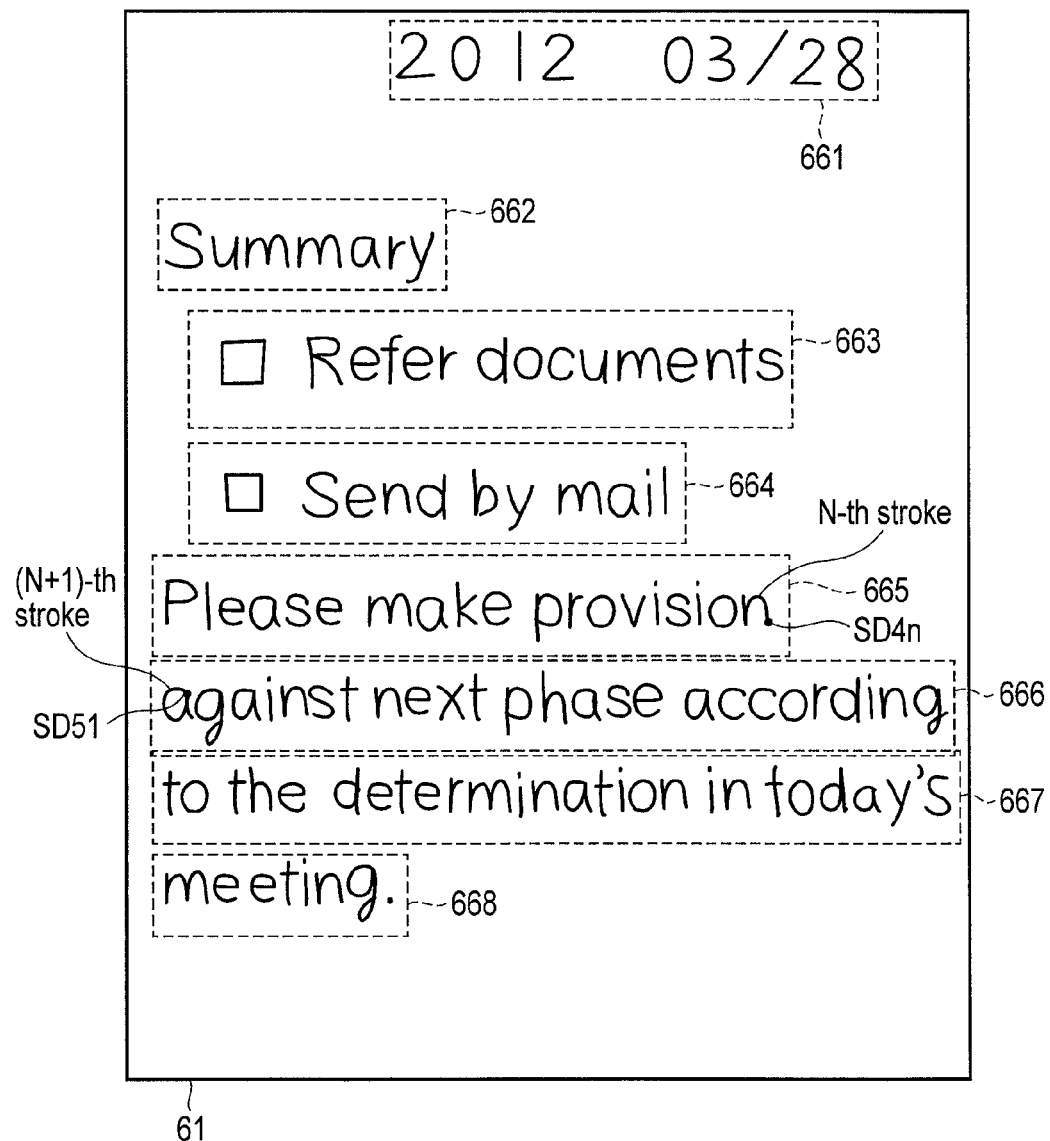
FIG. 8 is an exemplary view for explaining lines recognized from the handwritten document shown in FIG. 7.

In an example shown in FIG. 8, eight lines 661 to 668 on the handwritten document 61 are recognized. Like in this handwritten document 61, when characters are horizontally written in the handwritten document 61, the user is assumed to handwrite characters which belong to one line from the left to the right in the handwritten page. For this reason, the line recognition module 303 detects coordinates indicating that a touch position of an object (finger or pen 100) on the touch screen display 17 moves from the end position of a certain line to the start position of the next line from the time-series information (a plurality of stroke data).

More specifically, the line recognition module 303 detects two strokes which are successively handwritten and X-coordinates (coordinates in the horizontal direction) of which are largely changed from the right to the left in the handwritten document 61. In the example shown in FIG. 8, the line recognition module 303 detects, using last coordinate data SD4$n$ of an N-th stroke and first coordinate data SD51 of an (N+1)-th stroke which follows the N-th stroke, that one or more strokes until the N-th stroke and one or more strokes from the (N+1)-th stroke belong to different lines if an absolute difference between an X-coordinate of the coordinate data SD4$n$ and that of the coordinate data SD51 is equal to or larger than a threshold. That is, a line 665 until the N-th stroke SD4$n$ and a line 666 from the (N+1)-th stroke are detected.

The line recognition module 303 similarly detects a break of each line, thus recognizing the lines 661 to 668 in the handwritten document 61.

Next, the character recognition module 304 recognizes character codes corresponding to a plurality of handwritten characters included in a plurality of recognized lines (e.g. in a first line and a second line which follows the first line among a plurality of recognized lines). That is, the character recognition module 304 applies character recognition to handwritten characters respectively included in the plurality of lines, thereby converting these handwritten characters into character codes. The character recognition module 304 recognizes a character corresponding to one or more strokes in a plurality of strokes in each line.

As shown in FIG. 9, one or more strokes of a plurality of strokes handwritten in each of the plurality of lines 661 to 668 on the handwritten document 61 are associated with each recognized character which corresponds to the one or more strokes. That is, as a result of character recognition by the character recognition module 304, the plurality of strokes are divided into blocks 651, 652, 653, 654, . . . , 65$n$ for respective characters. For example, a plurality of strokes corresponding to "2012 03/28" handwritten in the line 661 are divided into blocks for respective characters corresponding to "2", "0", "1", "2", "0", "3", "2", and "8".

The character recognition module 304 calculates, for example, a first feature amount indicative of a shape of one or more strokes (target strokes to be processed) using one or more stroke data corresponding to the one or more strokes of the plurality of strokes. Then, the character recognition module 304 detects a character having a feature amount similar to the calculated first feature amount using character dictionary data which is stored in advance in the storage medium 402. This character dictionary data defines, for example, a plurality of characters and a plurality of feature amounts corresponding to these plurality of characters. Therefore, the character recognition module 304 recognizes a character having a second feature amount, a similarity to the calculated first feature amount of which is equal to or larger than a threshold, from the plurality of characters defined in the character dictionary data, thereby converting a handwritten character in a block to be processed into a character code.

Note that the character recognition module 304 may detect a plurality of character candidates having feature amounts, similarities to the first feature amount of which are equal to or larger than the threshold, from the plurality of characters defined in the character dictionary data. In this case, the character recognition module 304 narrows down a most likely character (that having a high likelihood) with respect to the target strokes from the plurality of detected character candidates based on, for example, language dictionary data indicative of co-occurrence probabilities and the like of words and characters and characters recognized from strokes adjacent to the target strokes (for example, right and left neighboring strokes of the target strokes). In this manner, the character recognition module 304 recognizes a character corresponding to the target strokes.

The character recognition module 304 calculates a font size used to display a character (character code) based on the size of the recognized character. The character recognition module 304 calculates a font size used to display a plurality of character codes in a line based on the size (for example, an average of the sizes of a plurality of handwritten characters) in each of the plurality of lines recognized by the line recognition module 303. Note that if the sizes of a plurality of handwritten characters included in each of the plurality of lines fall within a first range (that is, if variations of the sizes fall within a given range), the character recognition module 304 may set an average of the sizes of the plurality of handwritten characters as a font size used to display the plurality of character codes. For example, the character recognition module 304 determines that the size of a handwritten character "R" 655 and that of a handwritten character "o" 656 shown in FIG. 9 fall within the first range, and calculates one font size to be associated with these characters 655 and 656.

More specifically, the character recognition module 304 calculates a first font size based on sizes of a plurality of first handwritten characters included in a first line of the plurality of lines recognized by the line recognition module 303. Also, the character recognition module 304 calculates a second font size based on sizes of a plurality of second handwritten characters included in a second line of the plurality of lines. With this processing, the character recognition module 304 determines a font size used to display a character code. Note that the character recognition module 304 may determine a font size not for each line but for each group (to be described later).

Next, the character group recognition module 305 and formed document generator 306 recognize groups indicative of the composition in the handwritten document 61, and generate formed document data including character codes (those which are recognized by the character recognition module 304) which are laid out based on the recognized groups. For example, if a first line of the plurality of lines recognized by the line recognition module 303 and a second line which follows the first line satisfy a first condition, the character group recognition module 305 and formed document generator 306 can generate first formed document data using a plurality of first character codes corresponding to the first line and a plurality of second character codes corresponding to the second line. A first formed document corresponding to this first formed document data includes at least one character corresponding to at least one of the first character codes at a position corresponding to the second line or at least one character corresponding to at least one of the second character codes at a position corresponding to the first line. Therefore, for example, if the first and second lines satisfy the first condition, the character group recognition module 305 and formed document generator 306 generate first formed document data without inserting any linefeed code between the plurality of first character codes and the plurality of second character codes.

On the other hand, if the first and second lines do not satisfy the first condition, the character group recognition module 305 and formed document generator 306 can generate second formed document data using the plurality of first character codes and the plurality of second character codes. This second formed document data includes a plurality of characters corresponding to the plurality of first character codes at a position corresponding to the first line, and includes a plurality of characters corresponding to the plurality of second character codes at a position corresponding to the second line. Therefore, for example, if the first and second lines do not satisfy the first condition, the character group recognition module 305 and formed document generator 306 generate the second formed document data by inserting a linefeed code between the plurality of first character codes and the plurality of second character codes.

More specifically, the character group recognition module 305 recognizes groups indicative of the composition in the handwritten document 61 based on a plurality of lines recognized by the line recognition module 303 and a plurality of characters (character codes) recognized by the character recognition module 304. This group is that to which characters to be handled as one set such as a paragraph, an itemized form, a caption, a table, and a mathematical expression belong.

For example, if a first line of the plurality of recognized lines and a second line which follows the first line satisfy the first condition, the character group recognition module 305 recognizes that these first and second lines are included in a group of one paragraph; if the first and second lines do not satisfy the first condition, it recognizes that these first and second lines are not included in a group of one paragraph (they are included in different paragraph groups).

This first condition is, for example, that the horizontal position of the first line and that of the second line are aligned in the handwritten document 61. If a difference between the horizontal position (X coordinate) of the first line (for example, a start character of the first line) and that of the second line (for example, a start character of the second line) is smaller than a threshold, the character group recognition module 305 recognizes that the first and second lines are included in one paragraph group. Then, if the difference between horizontal position (X coordinate) of the first line and that of the second line is equal to or larger than the threshold, the character group recognition module 305 recognizes that the first and second lines are not included in one paragraph group.

The character group recognition module 305 and formed document generator 306 can further convert a handwritten document including an itemized form into a formed document. For example, if each of a start character code of a plurality of first character codes corresponding to a first line in a handwritten document and that of a plurality of second character codes corresponding to a second line which follows the first line is a specific character code (third character code), the character group recognition module 305 and formed document generator 306 generate second formed document data using the plurality of first character codes and the plurality of second character codes. This second formed document data includes a plurality of characters corresponding to the plurality of first character codes at a position corresponding to the first line and a plurality of characters corresponding to the plurality of second character codes at a position corresponding to the second line.

On the other hand, if each of the start character code of the plurality of first character codes and that of the plurality of second character codes is not the third character code, the character group recognition module 305 and formed document generator 306 generate third formed document data using the plurality of first character codes and the plurality of second character codes. This third formed document data includes at least one character corresponding to at least one character code of the plurality of first character codes at a position corresponding to the second line or includes at least one character corresponding to at least one character code of the plurality of second character codes at a position corresponding to the first line.

More specifically, the character group recognition module 305 further recognizes that a recognized paragraph group is a group including a plurality of lines which compose an itemized form. For example, if each of a character code of a start character in a first line of a plurality of lines and that of a start character in a second line which follows the first line is a specific character code (third character code) in the handwritten document 61, the character group recognition module 305 recognizes that these first and second lines are included in one itemized group. On the other hand, if each of the character code of the start character in the first line and that of the start character in the second line is not the specific character code, the character group recognition module 305 recognizes that these first and second lines are not included in one itemized group. This specific character is a character code corresponding to a symbol or character such as "•", "□", or "○" defined to be used in an itemized form.

FIG. 10 shows groups 671 to 674 recognized in the handwritten document 61.

Since a difference (an absolute value of the difference) between an X coordinate of a start character "2" of a character string "2012 03/28" corresponding to the line 661 and that of a start character "S" of a character string "Summary" corresponding to the line 662 is equal to or larger than the threshold, the group recognition module 305 recognizes the lines 661 and 662 as different paragraph groups 671 and 672. Also, since a difference (an absolute value of the difference) between neighboring X coordinates of start characters of a character string "Please . . . " corresponding to the line 665, a character string "against . . . " corresponding to the line 666, a character string "to the . . . " corresponding to the line 667, and a character string "meeting." corresponding to the line 668 is less than the threshold, the character group recognition module 305 recognizes these lines 665, 666, 667, and 668 as one paragraph group 674. Thus, the character group recognition module 305 can recognize the paragraph group 674 corresponding to a paragraph in the handwritten document 61.

Furthermore, since each of a character code "□" of a start character of the line 663 and a character code "□" of a start character of the line 664 is the specific character code, the character group recognition module 305 recognizes these lines 663 and 664 as one itemized group 673. Thus, the character group recognition module 305 can recognize the group 673 corresponding to an itemized form in the handwritten document 61.

The formed document generator 306 generates formed document data in which a plurality of characters (character codes) recognized by the character recognition module 304 are laid out based on the groups recognized by the character group recognition module 305. The formed document generator 306 generates formed document data in which the recognized character codes are laid out on the formed document 63 based on positions of the recognized groups 671 to 674 on the handwritten document 61. In this formed document data, for example, the formed document generator 306 does not insert any linefeed code between lines in each of the paragraph groups, inserts a linefeed code between lines in the itemized group, and inserts linefeed codes between the recognized groups.

Also, the formed document generator 306 associates the font sizes calculated by the character recognition module 304 with character codes in the formed document data. For example, in the generated formed document data, the formed document generator 306 associates a first font size with a plurality of first character codes corresponding to a first line of a plurality of recognized lines, and associates a second font size with a plurality of second character codes corresponding to a second line. Thus, in the formed document 63, character codes can be displayed to have associated font sizes based on the sizes of characters on the handwritten document 61.

As shown in FIG. 7, the formed document generator 306 lays out the recognized character codes on the formed document 63 based on the positions of the recognized groups 671 to 674 on the handwritten document 61. The formed document generator 306 lays out character codes "2012 03/28" at a position on the formed document 63 corresponding to that of the paragraph group 671 on the handwritten document 61. The formed document generator 306 lays out character codes "Summary" at a position on the formed document 63 corresponding to that of the paragraph group 672 on the handwritten document 61. Also, the formed document generator 306 lays out character codes corresponding to the itemized form including two items indicated by "□" at a position on the formed document 63 corresponding to that of the group 673 on the handwritten document 61. In this case, the formed document generator 306 inserts a linefeed code between two lines in the itemized group 673, and inserts a space (a character code of a space character) at the start position of each line so as to align the positions of the character codes at the start positions of these two lines (that is, to maintain indents at the start positions of the two items).

Furthermore, the formed document generator 306 lays out character codes "Please make provision . . . in today's meeting." at a position on the formed document 63 corresponding to that of the paragraph group 674 on the handwritten document 61. Since four pieces of character codes corresponding to four lines of character strings on the handwritten document 61 are included in one paragraph group 674, the formed document generator 306 does not insert any linefeed code between these four pieces of character codes. Thus, corresponding character codes can be laid out on the formed document 63 so as not to break one sentence "Please make provision . . . in today's meeting.".

The page storing processor 307 stores the generated formed document data in the storage medium 402.

The page acquisition processor 308 reads arbitrary already stored formed document data from the storage medium 402. The read formed document data is sent to the document display processor 309. The document display processor 309 analyzes the formed document data, and displays a formed document (formed page), in which characters indicated by character codes are laid out to have associated font sizes, on the screen based on the analysis result.

A case in which a handwritten document includes a handwritten table will be described below with reference to FIGS. 11, 12, and 13.

Figure 11:
FIG. 11 is a view showing a character recognition example of a handwritten document including a table.

FIG. 11 shows a character recognition example of a handwritten document 71 including a handwritten table 711. In this handwritten table 711, vertical and horizontal lines which explicitly indicate the table are not handwritten, but since a plurality of items are laid out to be aligned in the vertical and horizontal directions, a table of 4 rows×4 columns is presented.

By only character recognition, characters in the handwritten document 71 are converted into character codes regardless of a group like the table 711, and these character codes are output as a character recognition result 72. On this character recognition result 72, the recognized characters are laid out for respective lines on the handwritten document 71.

For example, on the handwritten document 71, character strings "June", "July", and "August" are respectively handwritten in three columns in the table 711. However, on the character recognition result 72, the character strings in the three columns are displayed as a continuous character string "June July August" regardless of the columns in the table 711.

In the same manner as in the example shown in FIG. 6, since the recognized characters (character codes) are merely placed in line by only character recognition of the handwritten document 71, for example, items in the table 711 are displayed in a coupled state. That is, information for the composition of the table 711 is lost.

For this reason, the character group recognition module 305 recognizes a group of the table 711 included in the handwritten document 71. The following description will be given under the assumption that the line recognition module 303 and character recognition module 304 have already recognized lines and characters in the handwritten document 71.

The character group recognition module 305 detects spaces between handwritten character strings in each of the plurality of lines recognized by the line recognition module 303. For example, the character group recognition module 305 detects a space between "June" and "July" and that between "July" and "August" in the line including "June July August" in the handwritten document 71. Then, the character group recognition module 305 detects whether the detected spaces are located at similar horizontal positions across a plurality of lines. For example, when the horizontal position of the space (first space) between "June" and "July" and that of a space (second space) between "4" and "10" fall within a predetermined range (first range), the character group recognition module 305 recognizes that "June" and "4" are located within a first column, and "July" and "10" are located within a second column. More specifically, when an absolute difference between an X coordinate of the left end of the first space and that of the left end of the second space is equal to or smaller than a threshold, and an absolute difference between an X coordinate of the right end of the first space and that of the right end of the second space is equal to or smaller than the threshold, the character group recognition module 305 recognizes that "June" and "4" are located within the first column, and "July" and "10" are located within the second column.

Therefore, as shown in FIG. 12, in the table 711 in the handwritten document 71, since positions of spaces 73S in respective lines fall within the predetermined range across a plurality of lines, columns 73A, 73B, 73C, and 73D in the table 711 are recognized. In this manner, the character group recognition module 305 can recognize a group 73 of the table in the handwritten document 71.

The formed document generator 306 generates formed document data in which character codes recognized from handwritten characters in the table 711 are laid out at a position on a formed document (formed page) 74 corresponding to that of the group 73 on the handwritten document 71. The formed document generator 306 lays out character codes corresponding to characters (character strings) in the table 711 at identical horizontal positions (e.g., to align the left ends of a plurality of items for each column) for respective columns based on the positions of the columns 73A, 73B, 73C, and 73D in the group 73 of the table.

Figure 13:
FIG. 13 is a view showing a conversion example of the handwritten document shown in FIG. 11 into a formed document including character codes by the electronic apparatus of the embodiment.

As shown in FIG. 13, on the formed document 74, items in the handwritten table 711 are laid out in consideration of the columns. For example, items "July", "4", "6", and "11" which belong to the same column 73B in the table 711 are laid out to be left-aligned. In this manner, the formed document 74 can be generated from the handwritten document 71 without losing information associated with the composition of the handwritten table 711.

Furthermore, in this embodiment, a handwritten document including a mathematical expression or source codes of a program may be converted into a formed document. In a mathematical expression or source codes of a program, if the line structure on the handwritten document is changed, the descriptions (interpretations) of the mathematical expression or program may be changed. For this reason, in the mathematical expression or source codes of the program, it is desired to maintain lines on the handwritten document.

For example, if a plurality of first character codes corresponding to a first line of a plurality of lines in a handwritten document include a character code of a predetermined mathematical symbol, the character group recognition module 305 recognizes that the first line as one mathematical expression group. The formed document generator 306 generates formed document data in which the plurality of first character codes corresponding to the mathematical expression group are laid out at a position on the formed document corresponding to that of the mathematical expression group on the handwritten document. Therefore, for example, if the plurality of first character codes include a character code of a predetermined mathematical symbol, the formed document generator 306 generates formed document data (second formed document data) which includes a plurality of characters corresponding to the plurality of first character codes at a position corresponding to the first line and includes a plurality of characters corresponding to a plurality of second character codes corresponding to a second line which follows the first line at a position corresponding to the second line. The formed document generator 306 inserts a linefeed code between, for example, the plurality of first character codes corresponding to first line and the plurality of second character codes corresponding to the second line in this formed document data.

Also, the character group recognition module 305 determines whether a plurality of first character codes corresponding to a first line of a plurality of lines included in a handwritten document are a source code of a program by using, for example, description specification data indicative of a specification for a description of a predetermined programming language. This description specification data defines symbols (character codes of symbols), character strings (for example, character codes corresponding to names (reserved words) used as a class, method, data type, and function), and the like, which are used to describe source codes in that predetermined programming language. This description specification data is stored in advance in, for example, the storage medium 402. If the plurality of first character codes are a source code of a program, the character group recognition module 305 recognizes the first line as one source code group. The formed document generator 306 generates formed document data in which the plurality of first character codes corresponding to the source code group are laid out at a position on a formed document corresponding to that of the source code group on the handwritten document. Therefore, for example, if the plurality of first character codes are a source code of a program, the formed document generator 306 generates formed document data (second formed document data) which includes a plurality of characters corresponding to the plurality of first character codes at a position corresponding to the first line, and includes a plurality of characters corresponding to a plurality of second character codes corresponding to a second line that follows the first line at a position corresponding to the second line. The formed document generator 306 inserts a linefeed code between, for example, the plurality of first character codes corresponding to the first line and the plurality of second character codes corresponding to the second line in this formed document data.

With the above processing, for a handwritten document including a mathematical expression or a source code of a program, formed document data in which lines of the mathematical expression or source code of the program on the handwritten document are maintained can be generated.

The processing for a horizontally written document in which characters are handwritten in the horizontal direction has been described above. Also, the aforementioned processing can be applied to a vertically written document in which characters are handwritten in the vertical direction. In this case, the line recognition module 303 recognizes vertically written lines from a handwritten document. The character recognition module 304 converts handwritten characters included in each recognized vertically written line into character codes. Then, using the recognized vertical lines and character codes, the character group recognition module 305 and formed document generator 306 recognize groups indicative of the composition of the handwritten document as a vertically written document, and generate formed document data (vertically written formed document data) including character codes which are laid out based on the recognized groups.

Furthermore, the conversion example of handwritten document data including time-series information (stroke data) into formed document data has been described above. Alternatively, characters printed or handwritten on a paper document (paper page) may be scanned to generate image data of that document, and the image data may be converted into formed document data. The line recognition module 303 recognizes a plurality of lines on an image using the image data. The character recognition module 304 converts handwritten characters included in the plurality of recognized lines into character codes using the image data. Then, the character group recognition module 305 and formed document generator 306 recognize groups indicative of the composition in the image (handwritten document), and generate formed document data including character codes which are laid out based on the recognized groups.

Figure 14:
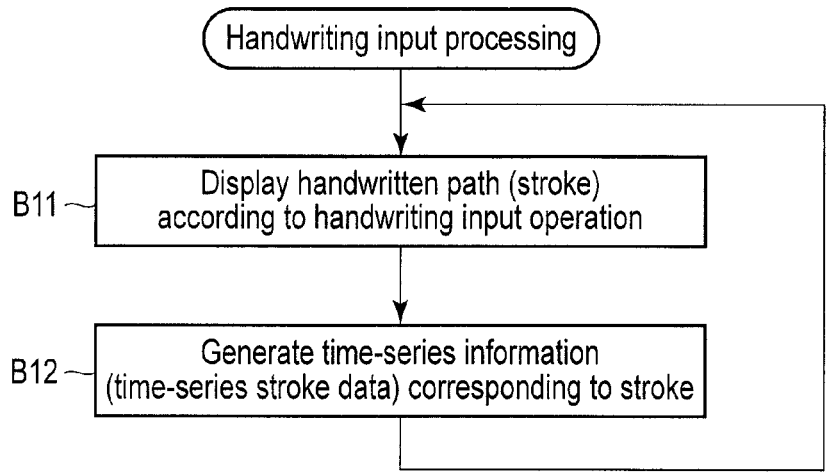
FIG. 14 is an exemplary flowchart showing the procedure of handwriting input processing executed by the electronic apparatus of to the embodiment.

An example of the procedure of handwriting input processing executed by the digital notebook application program 202 will be described below with reference to FIG. 14.

The path display processor 301 displays a path (stroke) of a motion of the pen 100 or the like by a handwriting input operation on the display 17A (block B11). The time-series information generator 302 generates the aforementioned time-series information (a plurality of stroke data arranged in a time-series order) based on a coordinate sequence corresponding to the path by the handwriting input operation (block B12). The time-series information generator 302 may temporarily store that time-series information in the work memory 401. Also, the page storing processor 307 may store the time-series information (that temporarily stored in the work memory 401) which is generated by the time-series information generator 302 in the storage medium as handwritten document data.

Figure 15:
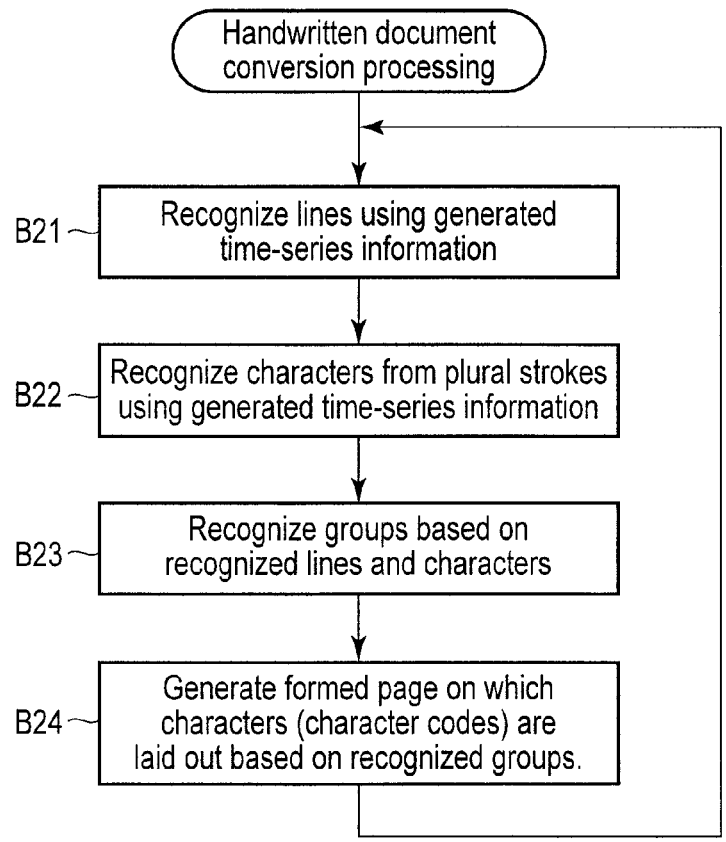
FIG. 15 is an exemplary flowchart showing the procedure of handwritten document conversion processing executed by the electronic apparatus of the embodiment.

FIG. 15 shows an example of the procedure of handwritten document conversion processing executed by the digital notebook application program 202.

The line recognition module 303 recognizes, using the generated time-series information (handwritten document data), a plurality of lines from a plurality of strokes (block B21). Also, the character recognition module 303 recognizes a plurality of characters from the plurality of strokes (block B22). For example, the character recognition module 303 converts respective handwritten characters into character codes. With this character recognition, the plurality of strokes are divided into blocks for respective characters.

Next, the group recognition module 305 recognizes groups of characters such as a paragraph, an itemized form, a table, and a mathematical expression based on the recognized lines and characters (block B23). Then, the formed document generator 306 generates a formed page on which the characters (character codes) are laid out based on the recognized groups (block B24).

As described above, according to this embodiment, a handwritten document including handwritten characters can be converted into a formed document including character codes. The line recognition module 303 recognizes a plurality of lines respectively including a plurality of handwritten characters on the handwritten document 61 using handwritten document data. The character recognition module 304 converts a plurality of handwritten characters included in each of the plurality of recognized lines into a plurality of character codes. Then, the character group recognition module 305 and formed document generator 306 recognize groups indicative of the composition in the handwritten document 61, and generate formed document data including character codes which are laid out based on the recognized groups.

In this manner, conversion (clean copy) from a handwritten document including characters handwritten on a device such as a digital notebook into a document file (formed document data) can be implemented without losing any composition (character sizes, column positions, and the like) indicated by handwriting and without requiring any operations of the user.

All the process procedures in this embodiment, which have been described with reference to the flowcharts of FIGS. 14 and 15, can be executed by software. Thus, the same advantageous effects as with the present embodiment can easily be obtained simply by installing a computer program, which executes the process procedures, into an ordinary computer through a computer-readable storage medium which stores the computer program, and by executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
circuitry configured to
  recognize a first line and a second line in a handwritten document, the second line following the first line;
  recognize first character codes corresponding to handwritten characters in the first line and second character codes corresponding to handwritten characters in the second line; and generate first formed document data by using the first character codes and the second character codes if the first line and the second line satisfy a condition wherein the first formed document data comprises at least one of the first character codes at a position corresponding to the second line or at least one of the second character codes at a position corresponding to the first line, wherein the condition comprises at least one of:

whether a character code of a start character in the first line is equal to a character code of a start character in the second line;

whether a character code of a start character in the first line and a character code of a start character in the second line are a specific character code;

a relation between a horizontal position of a start character in the first line and a horizontal position of a start character in the second line;

a relation between a vertical position of a start character in the first line and a vertical position of a start character in the second line;

whether the first character codes comprise a source code; and whether the first character codes comprise a character code of a mathematical symbol.

2. The apparatus of claim 1, wherein the circuitry is further configured to generate second formed document data by using the first character codes and the second character codes if the first line and the second line do not satisfy the condition, wherein the second formed document data comprises the first character codes at a position corresponding to the first line and the second character codes at a position corresponding to the second line.

3. The apparatus of claim 1, wherein the circuitry is further configured not to insert a linefeed code between the first character codes and the second character codes if the first line and the second line satisfy the condition, and the circuitry is further configured to insert a linefeed code between the first character codes and the second character codes if the first line and the second line do not satisfy the first condition.

4. The apparatus of claim 1, wherein the condition further comprises whether a difference between a horizontal position of the start character in the first line and a horizontal position of the start character in the second line is smaller than a threshold.

5. The apparatus of claim 1, wherein the circuitry is further configured to generate second formed document data by using the first character codes and the second character codes if the character code of the start character in the first line and the character code of the start character in the second line are a third character code, the second formed document data comprising the first character codes at a position corresponding to the first line and the second character codes at a position corresponding to the second line, wherein the circuitry is further configured to generate third formed document data by using the first character codes and the second character codes if the character code of the start character in the first line and the character code of the start character in the second line are not the third character code, the third formed document data comprising at least one of the first character codes at a position corresponding to the second line or at least one of the second character codes at a position corresponding to the first line.

6. The apparatus of claim 5, wherein the circuitry is further configured to insert a linefeed code between the first character codes and the second character codes if the character code of the start character in the first line and the character code of the start character in the second line are third character code, and the circuitry is further configured not to insert a linefeed code between the first character codes and the second character codes if the character code of the start character in the first line and the character code of the start character in the second line are not the third character code.

7. The apparatus of claim 1, wherein the circuitry is further configured to generate the first formed document data if a horizontal position of a first space in the first line and a horizontal position of a second space in the second line fall within a first range, wherein in the first formed document data, a character code of a character that follows the first space and a character code of a character that follows the second space are at identical horizontal positions.

8. The apparatus of claim 1, wherein the circuitry is further configured to calculate a first font size based on sizes of the first characters and to calculate a second font size based on sizes of the second characters, and the circuitry is further configured to generate the first formed document data in which the first font size is associated with the first character codes, and the second font size is associated with the second character codes.

9. The apparatus of claim 1, wherein the circuitry is further configured to generate second formed document data by using the first character codes and the second character codes if the first character codes comprise a character code of a mathematical symbol, the second formed document data comprising the first character codes at a position corresponding to the first line and comprising the second character codes at a position corresponding to the second line.

10. The apparatus of claim 1, wherein the circuitry is further configured to determine whether the first character codes comprise a source code of a program by using data indicative of a specification for a description of a predetermined programming language, and the circuitry is further configured to generate second formed document data if the first character codes comprise the source code, the second formed document data comprising the first character codes at a position corresponding to the first line and the second character codes at a position corresponding to the second line.

11. The apparatus of claim 1, further comprising a display configured to display a document based on character codes in the first formed document data on a screen.

12. The apparatus of claim 1, further comprising a touch screen display configured to input handwritten document data comprising a plurality of stroke data corresponding to a plurality of strokes based on a handwriting input operation using the touch screen display.

13. A handwriting document processing method implemented at least partially by a processor, the method comprising:

recognizing a first line and a second line in a handwritten document, the second line following the first line;

recognizing first character codes corresponding to handwritten characters in the first line and second character codes corresponding to handwritten characters in the second line; and generating first formed document data by using the first character codes and the second character codes if the first line and the second line satisfy a condition, the first formed document data comprising at least one of the first character codes at a position corresponding to the second line or at least one of the second character codes at a position corresponding to the first line, wherein the condition comprises at least one of:

whether a character code of a start character in the first line is equal to a character code of a start character in the second line;

whether a character code of a start character in the first line and a character code of a start character in the second line are a specific character code;

a relation between a horizontal position of a start character in the first line and a horizontal position of a start character in the second line;

a relation between a vertical position of a start character in the first line and a vertical position of a start character in the second line;

whether the first character codes comprise a source code; and whether the first character codes comprise a character code of a mathematical symbol.

14. A computer-readable, non-transitory storage medium having stored thereon a program which is executable by a computer, the program controlling the computer to execute functions of:

recognizing a first line and a second line in a handwritten document, the second line following the first line;

recognizing first character codes corresponding to handwritten characters in the first line and second character codes corresponding to handwritten characters in the second line; and generating first formed document data by using the first character codes and the second character codes if the first line and the second line satisfy a condition, the first formed document data comprising at least one of the first character codes at a position corresponding to the second line or at least one of the second character codes at a position corresponding to the first line, wherein the condition comprises at least one of:

whether a character code of a start character in the first line is equal to a character code of a start character in the second line;

whether a character code of a start character in the first line and a character code of a start character in the second line are a specific character code;

a relation between a horizontal position of a start character in the first line and a horizontal position of a start character in the second line;

a relation between a vertical position of a start character in the first line and a vertical position of a start character in the second line;

whether the first character codes comprise a source code; and whether the first character codes comprise a character code of a mathematical symbol.

15. The method of claim 13, further comprising generating second formed document data by using the first character codes and the second character codes if the first line and the second line do not satisfy the condition, wherein the second formed document data comprises the first character codes at a position corresponding to the first line and the second character codes at a position corresponding to the second line.

16. The method of claim 13, further comprising:

generating second formed document data by using the first character codes and the second character codes if the character code of the start character in the first line and the character code of the start character in the second line are a third character code, the second formed document data comprising the first character codes at a position corresponding to the first line and the second character codes at a position corresponding to the second line, generating third formed document data by using the first character codes and the second character codes if the character code of the start character in the first line and the character code of the start character in the second line are not the third character code, the third formed document data comprising at least one of the first character codes at a position corresponding to the second line or at least one of the second character codes at a position corresponding to the first line.

17. The method of claim 13, further comprising generating the first formed document data if a horizontal position of a first space in the first line and a horizontal position of a second space in the second line fall within a first range, wherein in the first formed document data, a character code of a character that follows the first space and a character code of a character that follows the second space are at identical horizontal positions.

18. The method of claim 13, further comprising:

calculating a first font size based on sizes of the first characters and to calculate a second font size based on sizes of the second characters, and generating the first formed document data in which the first font size is associated with the first character codes, and the second font size is associated with the second character codes.

19. The storage medium of claim 14, further comprising generating second formed document data by using the first character codes and the second character codes if the first line and the second line do not satisfy the condition, wherein the second formed document data comprises the first character codes at a position corresponding to the first line and the second character codes at a position corresponding to the second line.

20. The storage medium of claim 14, further comprising:

generating second formed document data by using the first character codes and the second character codes if the character code of the start character in the first line and the character code of the start character in the second line are a third character code, the second formed document data comprising the first character codes at a position corresponding to the first line and the second character codes at a position corresponding to the second line, generating third formed document data by using the first character codes and the second character codes if the character code of the start character in the first line and the character code of the start character in the second line are not the third character code, the third formed document data comprising at least one of the first character codes at a position corresponding to the second line or at least one of the second character codes at a position corresponding to the first line.

21. The storage medium of claim 14, further comprising generating the first formed document data if a horizontal position of a first space in the first line and a horizontal position of a second space in the second line fall within a first range, wherein in the first formed document data, a character code of a character that follows the first space and a character code of a character that follows the second space are at identical horizontal positions.

22. The storage medium of claim 14, further comprising:

calculating a first font size based on sizes of the first characters and to calculate a second font size based on sizes of the second characters, and generating the first formed document data in which the first font size is associated with the first character codes, and the second font size is associated with the second character codes.

* * * * *